US007614097B1

(12) United States Patent
Cheng

(10) Patent No.: US 7,614,097 B1
(45) Date of Patent: Nov. 10, 2009

(54) STRUCTURE OF A FOLDABLE MECHANISM OF A BABY MESH BED

(76) Inventor: Ying-Hsiung Cheng, No. 14, Lane 477, Chung Shan Rd., Jen Te Hsiang, Tainan Hsien (TW)

( * ) Notice: Subject to any disclaimer, the term of this patent is extended or adjusted under 35 U.S.C. 154(b) by 1 day.

(21) Appl. No.: 12/155,354

(22) Filed: Jun. 3, 2008

(51) Int. Cl.
*A47D 7/00* (2006.01)
*A47D 13/06* (2006.01)
*E05D 11/10* (2006.01)
*F16C 11/10* (2006.01)

(52) U.S. Cl. .............................. 5/99.1; 5/98.1; 16/324; 403/102

(58) Field of Classification Search .................... 5/99.1, 5/93.1, 98.1–98.3; 16/324–326; 403/102, 403/325
See application file for complete search history.

(56) References Cited

U.S. PATENT DOCUMENTS

| | | | | | |
|---|---|---|---|---|---|
| 5,745,954 | A | * | 5/1998 | Shogan et al. | 16/343 |
| 5,761,755 | A | * | 6/1998 | Huang | 5/99.1 |
| 5,781,944 | A | * | 7/1998 | Huang | 5/99.1 |
| 5,857,229 | A | * | 1/1999 | Magnani, Jr. | 5/99.1 |
| 6,125,483 | A | * | 10/2000 | Stroud et al. | 5/99.1 |
| 6,202,229 | B1 | * | 3/2001 | Cheng | 5/99.1 |
| 6,634,039 | B1 | * | 10/2003 | Cheng | 5/99.1 |
| 7,108,443 | B2 | * | 9/2006 | Chen | 403/102 |
| 7,284,288 | B2 | * | 10/2007 | Cheng | 5/98.1 |
| 7,380,311 | B2 | * | 6/2008 | Chen | 16/326 |
| 2003/0061658 | A1 | * | 4/2003 | Longenecker | 5/99.1 |
| 2006/0021136 | A1 | * | 2/2006 | Cheng | 5/99.1 |

* cited by examiner

*Primary Examiner*—Robert G Santos
(74) *Attorney, Agent, or Firm*—Rosenberg, Klein & Lee

(57) ABSTRACT

A baby mesh bed includes an upper frame part, which has a foldable mechanism on each side; each foldable mechanism includes a joining component, two connecting rods, and two opposite fixing bars; the connecting rods are pivoted to two ends of the joining component; the fixing bars are pivoted on the joining component to prop inner ends of the connecting rods; each fixing bar has an uppermost recessed propping portion; a first one of the fixing bars has a pulled part protruding therefrom; a spring is interposed between and joined on the fixing bars to bias the fixing bars; a co-moving device is joined on both the fixing bars for the fixing bars to be co-movable; when the pulled part of the first fixing bar is pulled, the fixing bars will pivot to no longer prop the connecting rods, thus allowing the rods to pivot to a vertical not-in-use position.

4 Claims, 5 Drawing Sheets

STRUCTURE OF A FOLDABLE MECHANISM OF A BABY MESH BED

BACKGROUND OF THE INVENTION

1. Field of the Invention

The present invention relates to a foldable mechanism of a baby mesh bed, more particularly one, which has a relatively simple structure and low manufacturing cost, and which can be held in an in-use position relatively firmly so as not to fold accidentally to cause danger.

2. Brief Description of the Prior Art

A common baby mesh bed includes four foldable armrest mechanisms, which are arranged on four sides of an uppermost portion of the mesh bed respectively. Referring to FIG. 5, a currently existing foldable armrest mechanism 1 of a baby mesh bed includes two connecting tubes 41, a joining component 42, and a sliding piece 44. The joining component 42 has such a shape as to have an inverted U-shaped vertical section, and has a gap 421 on each of two ends of an uppermost portion thereof, and two opposite through holes 422 on two sides of a middle of an upper portion thereof.

The connecting tubes 41 are received in and pivoted to two ends of an upper portion of the joining component 42 at inward ends thereof. Each of the connecting tubes 41 has a through hole 411 on its inward end, and a V-shaped elastic piece 43 is partly held in the inward end of each of the connecting tubes 41, with two free ends thereof sticking out from the connecting tube 41; each said V-shaped elastic piece 43 has two fixing protrusions 431, which stick out through the through holes 411 of the connecting tube 41 respectively, and which will pass into the through holes 422 to prevent the connecting tube 41 from pivoting on the joining component 42 after the armrest mechanism 4 has been moved to a stretched in-use position.

Furthermore, the joining component 42 has a gap 423 on a middle of a lower portion, and a round joining hole 424 above the gap 423. And, the sliding piece 44 has a slot 442, and is held in the middle of the joining component 42. And, a joining rod 441 is passed through the round joining hole 424 and the slot 442 so that the sliding piece 44 can be moved up and down relatively to the joining component 42. The sliding piece 44 has a V-shaped gap 443, and a holding gap 444 under the V-shaped gap 443. A spring 46 is positioned in the holding gap 444, and joined at an upper end thereof to a joining piece 445 positioned under the joining rod 441 so that the sliding piece 44 is biased towards a lower position by the spring 446; the outer free ends of the V-shaped elastic pieces 43 will be received in an upper wider portion of the V-shaped gap 443 when the sliding piece 44 is in the lower position. Therefore, a lower narrower portion of the V-shaped gap 443 will come into contact with the outer free ends of the V-shaped elastic pieces 43 as soon as the sliding piece 44 is pushed to an upper position; thus, the V-shaped elastic pieces 43 are pressed to reduce their width, with the fixing protrusions 431 moving out of the through holes 422 of the joining component 42. Consequently, the connecting tubes 41 are no longer fixed to the joining component 42, and can be pivoted so as to move the armrest mechanism 4 into the folded position.

The above foldable armrest mechanism is found to have the following drawbacks:

1. The foldable armrest mechanism isn't safe to use; the fixing protrusions of the V-shaped elastic pieces can move out of the through holes of the joining component to no longer fix the connecting rods to the joining component, and the armrest mechanism can move to the folded position accidentally if the mesh bed is subjected to vibration.

2. The armrest mechanism has a relatively complicate structure, and high manufacturing cost because of adoption of the V-shaped elastic pieces, which are used to fix the connecting rods to the joining component, and can be disengaged from the joining component to allow the connecting rods to turn by means of pushing the sliding piece.

Therefore, it is a main object of the present invention to provide an improvement on a foldable mechanism of a baby mesh bed to overcome the above problems.

SUMMARY OF THE INVENTION

A foldable mechanism of a baby mesh bed in accordance with an embodiment of the present invention includes a joining component, two connecting rods, and a pair of opposite fixing bars. The connecting rods are pivoted to two ends of an upper portion of the joining component respectively. The fixing bars are pivoted on a lower portion of the joining component, and will prop the inner ends of the connecting rods after the connecting rods are pivoted to a horizontal in-use position. Each fixing bar has an uppermost recessed propping portion, and a first one of the fixing bars has a lever-like pulled part. An elastic element is interposed between and joined on both the fixing bars to exert a biasing force on the fixing bars while a co-moving device is joined on both the fixing bars for the fixing bars to be co-movable with each other. When the pulled part of the fixing bar is pulled, both the fixing bars will pivot to such a position as to no longer prop the connecting rods, thus allowing the rods to pivot to a vertical not-in-use position.

BRIEF DESCRIPTION OF THE DRAWINGS

The present invention will be better understood by referring to the accompanying drawings, wherein.

DETAILED DESCRIPTION OF THE PREFERRED EMBODIMENTS

Figure 1:
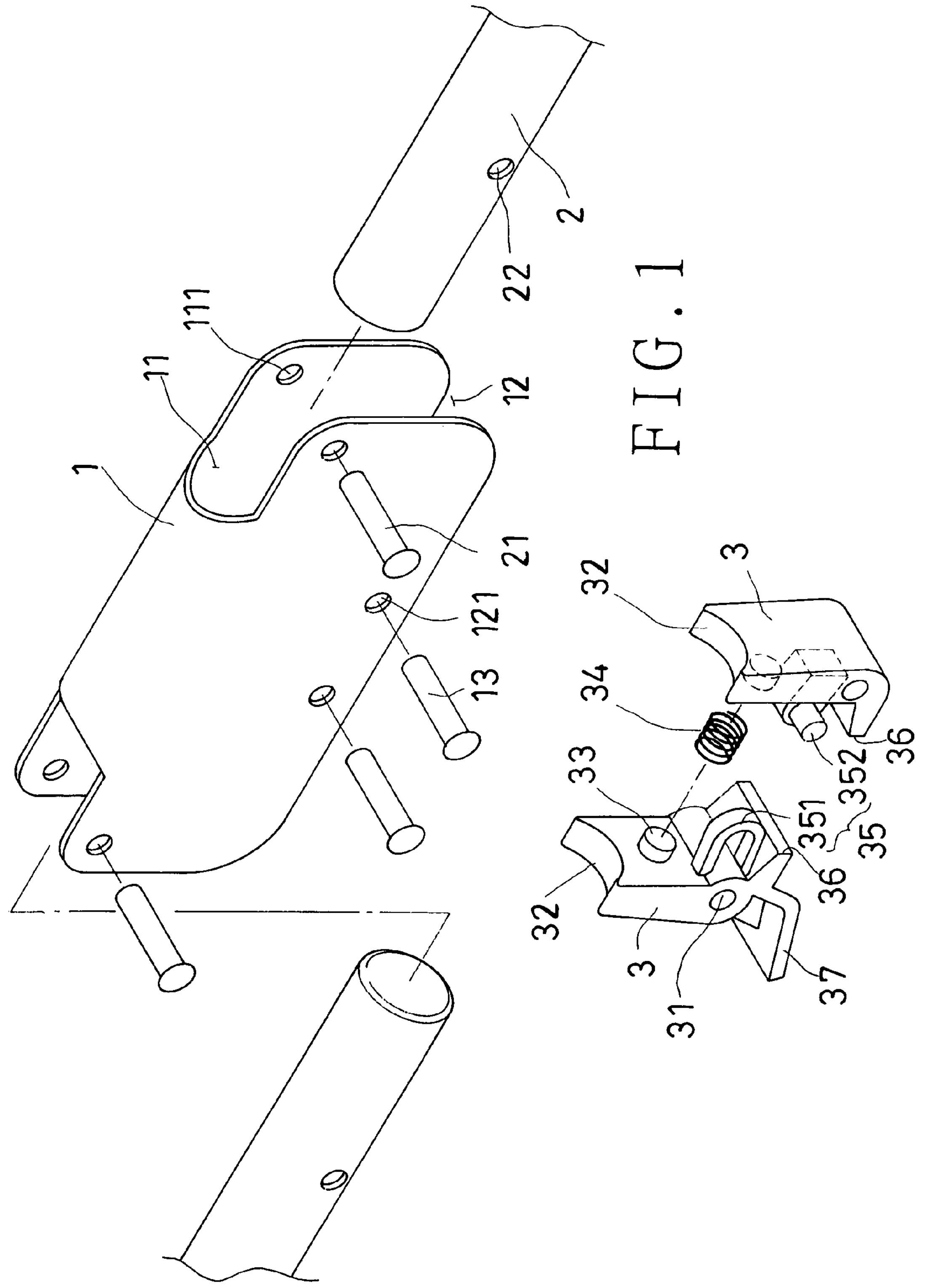
FIG. 1 is an exploded perspective view of the present invention.

Referring to FIG. 1, a preferred embodiment of a foldable mechanism of a baby mesh bed of the present invention includes a joining component 1, two connecting rods 2, and a pair of opposite fixing bars 3.

The joining component 1 has a gap 11 on each of two ends of an uppermost portion thereof, and an internal holding space 12, which exists under the uppermost portion, and adjoins the gaps 11. The joining component 1 has two opposite pivotal holes 111 on each of two ends thereof.

The connecting rods 2 each have a pivotal hole 22. The connecting rods 2 are each held in a respective one of the two ends of the joining component 1 at an inward end thereof, and are each pivoted on the joining component 1 by means of a pivotal piece 21 passed through the pivotal holes 111 and 22.

Figure 2:
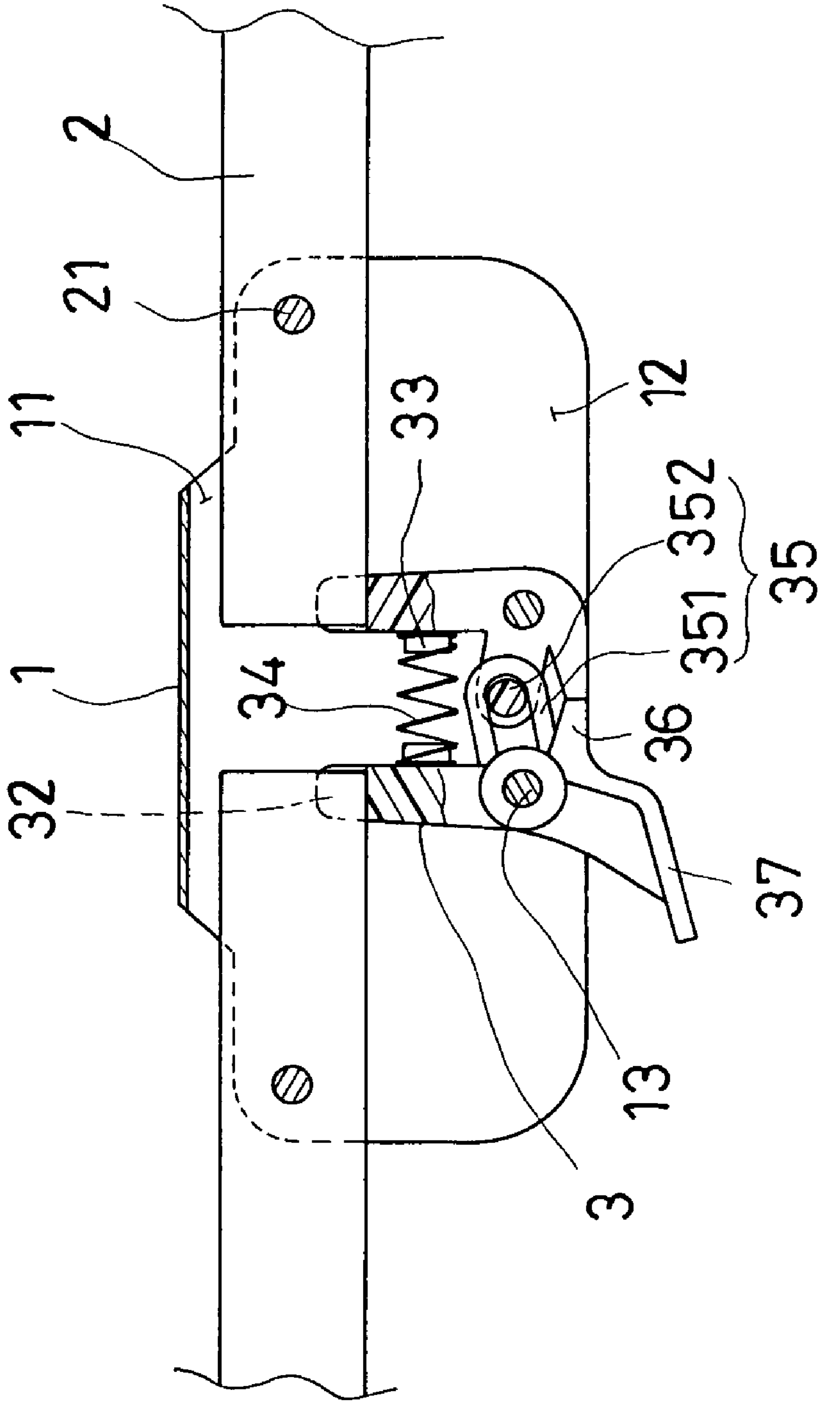
FIG. 2 is a sectional view of the present invention.

The fixing bars 3 are positioned next to each other in the holding space 12 of the joining component 1, and pivoted to the joining component 1. The joining component 1 has two pairs of opposite pivotal holes 121 thereon, which communicate with the holding space 12. Each of the fixing bars 3 has a pivotal hole 31, and is pivoted on the joining component 1 by means of a pivotal piece 13 passed through the pivotal holes 121 of the joining component 1 as well as the pivotal hole 31. Each of the fixing bars 3 has a recessed propping portion 32 on a top thereof to prop a corresponding said connecting rod 2. The fixing bars 3 have opposite connecting protrusions 33 on first (upper) portions thereof while an elastic element 34 is positioned between the fixing bars 3, and joined on the connecting protrusions 33 at two ends thereof so that the first portions of the fixing bars 3 are biased to be apart from each other by means of the elastic element 34, and the fixing bars 3 are usually in an in-use position. Each of the fixing bars 3 has a pivotal portion 351, and a pivotal rod 352 is passed through the pivotal portions 351 of both the fixing bars 3; thus, the pivotal portions 351 and the pivotal rod 352 comprise a co-moving device 35, which makes the fixing bars 3 co-movable with each other. The fixing bars 3 have opposite pushing parts 36 protruding from lower ends thereof, which will be propped against each other when the fixing bars 3 are in the in-use position to prop the connecting rods 2, as shown in FIG. 2. Furthermore, a first one of the fixing bars 3 has a lever-like pulled part 37 protruding outwards therefrom so that the user is allowed to move both the fixing bars 3 between an in-use position and a not-in-use one by means of exerting force on the pulled part 37 of the first fixing bar 3.

Shown in FIG. 2 is the foldable mechanism of a baby mesh bed in a stretched in-use configuration, wherein the connecting rods 2 is in a horizontal position, and prevented from pivoting on the joining component 1 with the inner ends thereof being propped on the uppermost recessed propping portions 32 of the fixing bars 3, and wherein the elastic element 34 keeps the fixing bars 3 in the in-use position with the first portions of the fixing bars 3 being apart from each other. Therefore, the fixing bars 3 can't move to the not-in-use position, and the connecting rods 2 are prevented from pivoting away from the horizontal in-use position relative to the joining component 1 accidentally.

Figure 3:
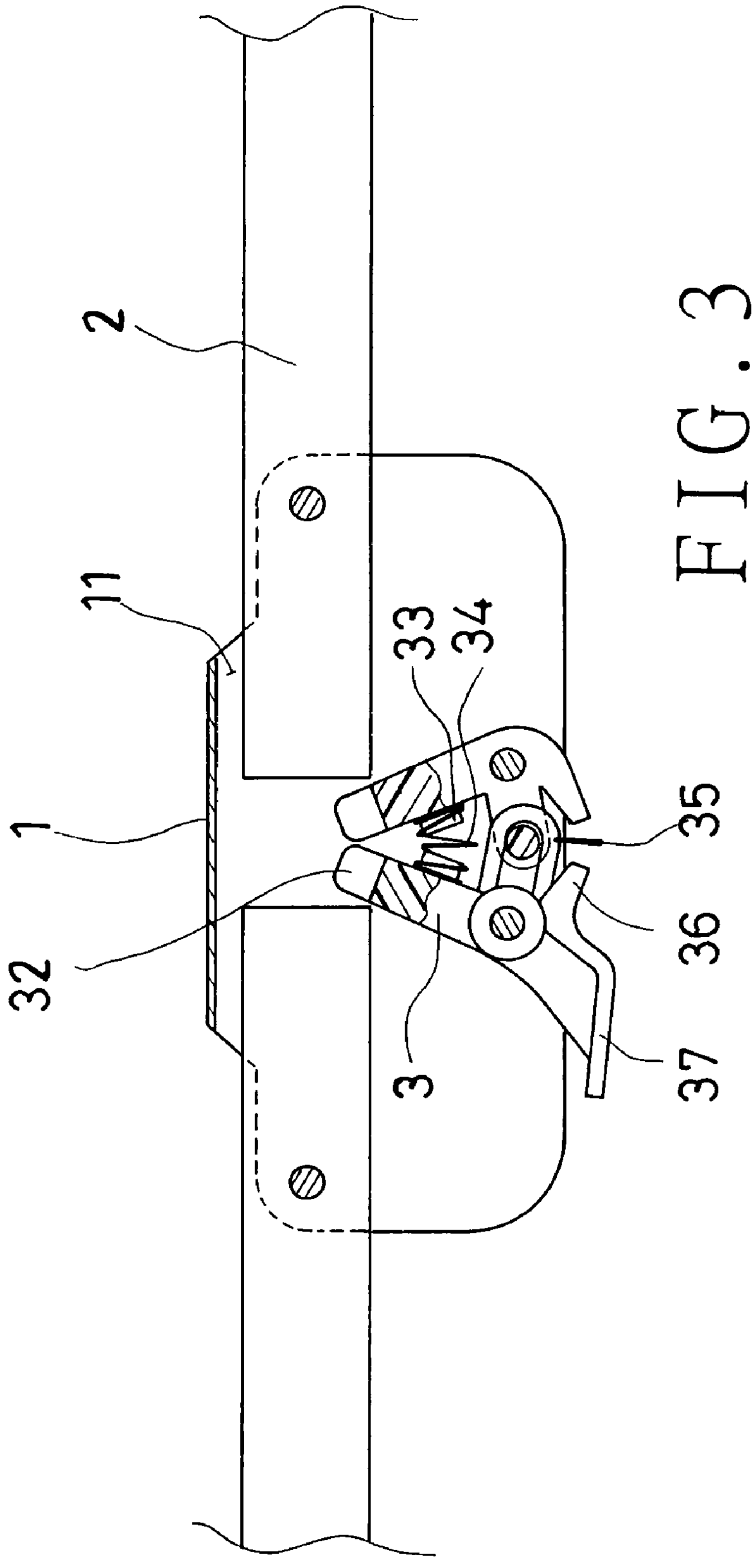
FIG. 3 is a lateral sectional view of the present invention during a folding motion (1)
Figure 4:
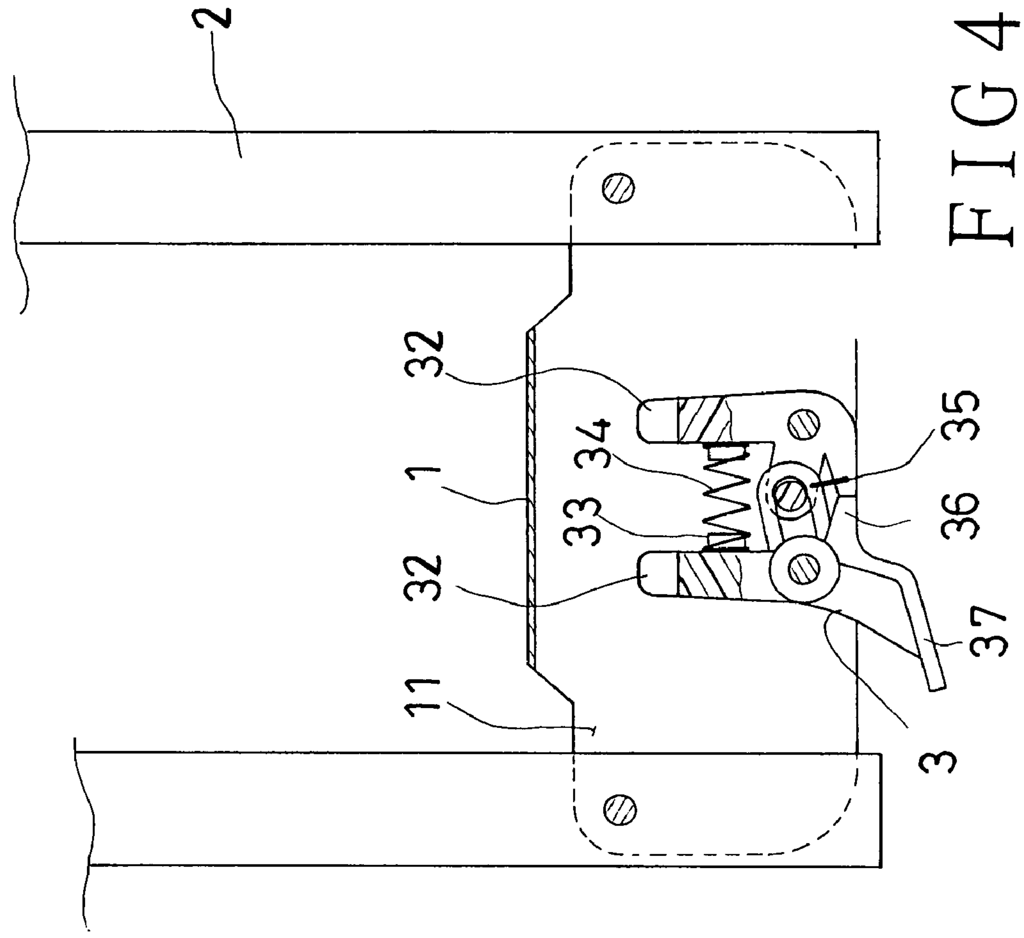
FIG. 4 is a lateral sectional view of the present invention during a folding motion (2)
Figure 5:
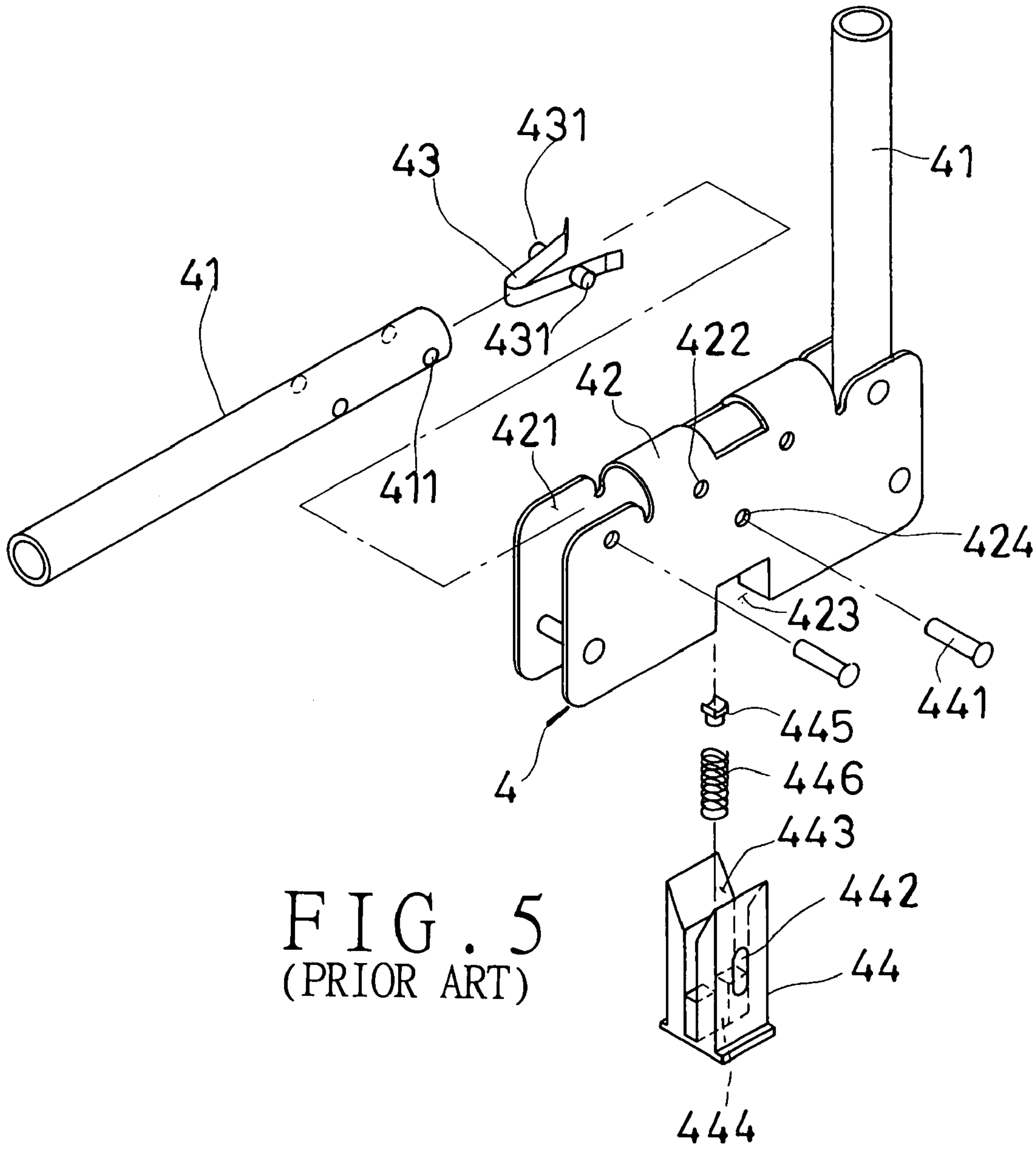
FIG. 5 (PRIOR ART)
FIG. 5 is an exploded perspective view of the prior art.

Shown in FIG. 3 is the foldable mechanism of a baby mesh bed during a folding action, and shown in FIG. 4 is the foldable mechanism in the folded not-in-use configuration. To fold the foldable mechanism, first the user should apply force to the pulled part 37 of the first fixing bar 3, and next pivot the connecting rods 2 to a vertical position, as shown in FIG. 4; when the pulled part 37 is pulled, the first fixing bar 3 will pivot on the joining component 1 with its first (upper) portion moving towards the first portion of the other (second) fixing bar 3, its pushing part 36 moving away from the pushing part 36 of the second fixing bar 3, and with the pivotal portions 351 of both the fixing bars 3 moving downwards. Thus, the other fixing bar 3 will also pivot on the joining component 1 with its first portion moving towards the first portion of the first fixing bar 3, and with its pushing part 36 moving away from the pushing part 36 of the first fixing bar 3. In other words, the first portions of the fixing bars 3 will be close to each other, and compress the elastic element 34, as shown in FIG. 3. Consequently, the fixing bars 3 will no longer prop the connecting rods 1, and the connecting rods 3 can be pivot to the vertical not-in-use position, as shown in FIG. 4.

From the above description, it can be easily seen that the present invention has the following advantages over the prior art:

1. There is less risk of the foldable mechanism of a baby mesh bed of the present invention folding accidentally to cause danger; the fixing bars of the present invention have the uppermost recessed propping portions, and the connecting rods will be firmly propped on the recessed propping portions of the fixing bars at their inner ends after having been pivoted to the horizontal in-use position.

2. The foldable mechanism of the present invention has a relatively simple structure and low manufacturing cost, and is relatively easy to use as compared with the prior art; the user can move both the fixing bars to the not-in-use position merely by means of exerting force on the pulled part of the first one of the fixing bars, in which not-in-use position both the fixing bars can no longer stop the connecting rods from pivoting to the vertical not-in-use position.

What is claimed is:

1. A structure of a foldable mechanism of a baby mesh bed, comprising:

a joining component;

two connecting rods; the connecting rods being each pivoted on a respective one of two ends of an uppermost portion of the joining component;

a pair of opposite fixing bars pivoted on a lower portion of the joining component; each of the fixing bars having a recessed propping portion formed on an uppermost side thereof; a first one of the fixing bars having a lever-shaped pulled part protruding therefrom;

an elastic element interposed between and joined on both the fixing bars to exert a biasing force on the fixing bars; and a co-moving device interposed to define a displaceable pivot point between the fixing bars for the fixing bars to be co-movable with each other.

2. The structure of a foldable mechanism of a baby mesh bed as claimed in claim 1, wherein the fixing bars have opposite connecting protrusions thereon, and the elastic element is joined on the connecting protrusions at two ends thereof.

3. A structure of a foldable mechanism of a baby mesh bed, comprising:

a joining component;

two connecting rods; the connecting rods being each pivoted on a respective one of two ends of an uppermost portion of the joining component;

a pair of opposite fixing bars pivoted on a lower portion of the joining component; each of the fixing bars having a recessed propping portion formed on an uppermost side thereof; a first one of the fixing bars having a lever-shaped pulled part protruding therefrom;

an elastic element interposed between and joined on both the fixing bars to exert a biasing force on the fixing bars; and a co-moving device interposed between the fixing bars for the fixing bars to be co-movable with each other;

wherein the co-moving device includes a pivotal portion protruding from each of the fixing bars, and a pivotal rod joined to both the pivotal portions to pivot the fixing bars together.

4. The structure of a foldable mechanism of a baby mesh bed as claimed in claim 1, wherein the fixing bars have opposite pushing parts protruding from lower ends thereof.

* * * * *